United States Patent
Sadanowicz

(10) Patent No.: US 7,850,251 B1
(45) Date of Patent: Dec. 14, 2010

(54) WHEEL HUB AND BRAKE ROTOR ASSEMBLY

(75) Inventor: David Thomas Sadanowicz, Canton, MI (US)

(73) Assignee: Robert Bosch GmbH, Stuttgart (DE)

( * ) Notice: Subject to any disclaimer, the term of this patent is extended or adjusted under 35 U.S.C. 154(b) by 100 days.

(21) Appl. No.: 12/204,931

(22) Filed: Sep. 5, 2008

(51) Int. Cl.
*F16D 55/36* (2006.01)
*B60B 27/00* (2006.01)

(52) U.S. Cl. ............... 301/6.8; 301/105.1; 188/18 A; 188/218 XL

(58) Field of Classification Search ............ 301/6.1, 301/6.8, 105.1; 188/18 A, 218 XL
See application file for complete search history.

(56) References Cited

U.S. PATENT DOCUMENTS

| | | | | |
|---|---|---|---|---|
| 2,161,359 | A * | 6/1939 | Lambert | 188/72.2 |
| 2,973,836 | A * | 3/1961 | Klaue | 188/71.6 |
| 3,724,907 | A * | 4/1973 | Housel | 301/105.1 |
| 4,379,501 | A * | 4/1983 | Hagiwara et al. | 188/218 XL |
| 5,281,004 | A * | 1/1994 | O'Leary, Jr. | 301/105.1 |
| 6,039,407 | A * | 3/2000 | Wiacek et al. | 301/111.04 |
| 6,059,374 | A * | 5/2000 | Goddard | 301/6.1 |
| 6,076,896 | A * | 6/2000 | Bertetti et al. | 301/105.1 |
| 6,095,291 | A * | 8/2000 | Bertetti et al. | 188/18 A |
| 6,309,110 | B1 * | 10/2001 | Tajima et al. | 384/544 |
| 6,988,598 | B2 | 1/2006 | Williams | |
| 2002/0157908 | A1 * | 10/2002 | Burgoon et al. | 188/218 XL |

FOREIGN PATENT DOCUMENTS

| | | |
|---|---|---|
| DE | 2919411 | 11/1980 |
| DE | 19537808 | 4/1997 |
| DE | 19931174 | 2/2000 |
| DE | 10323310 | 12/2004 |
| EP | 0834670 | 4/1998 |
| JP | 58085701 A * | 5/1983 |
| WO | 2009108623 | 9/2009 |

OTHER PUBLICATIONS

International Search Report in corresponding application (i.e. PCT/US2009/055141), mailed Oct. 29, 2009 (5 pages).

* cited by examiner

*Primary Examiner*—Russell D Stormer
(74) *Attorney, Agent, or Firm*—Maginot, Moore & Beck

(57) ABSTRACT

A vehicle wheel assembly has a vehicle wheel with a number of angularly spaced mounting bolt receiving apertures, a wheel hub with axially inboard and outboard surfaces and a plurality of radially outwardly protruding bosses interspersed with clearance spaces and a disc brake rotor having a like plurality of radially inwardly protruding bosses interspersed with clearance spaces. A first set of threaded fasteners couple the wheel to the outboard surface of the hub and a second set of threaded fasteners couple the rotor to the inboard surface of the hub. Each hub boss includes an axial depression in the region of the bore for receiving one of the second set of threaded fasteners allowing a head of the threaded fastener to be axially recessed inboard of the wheel receiving portion of the outboard hub surface.

13 Claims, 2 Drawing Sheets

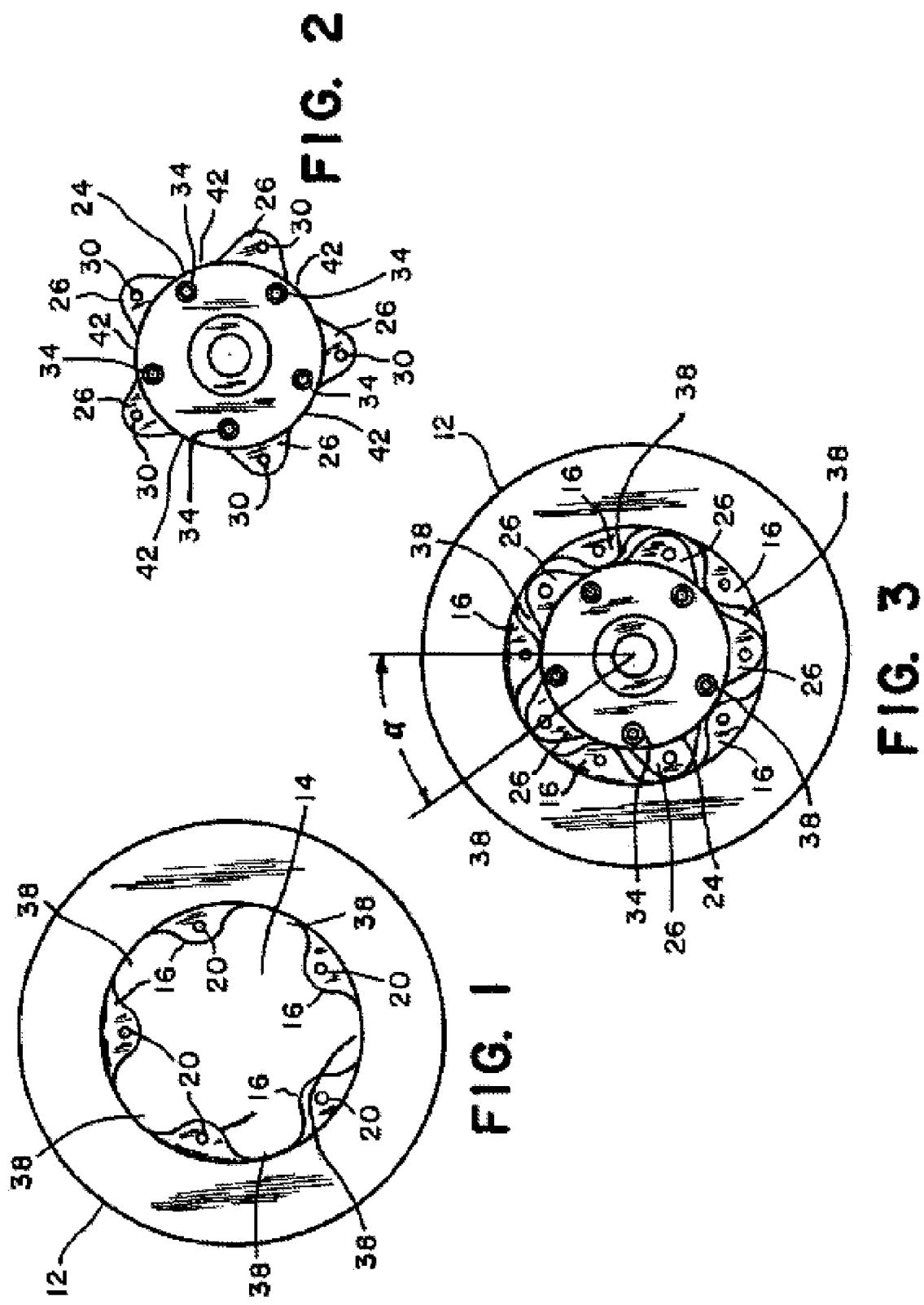

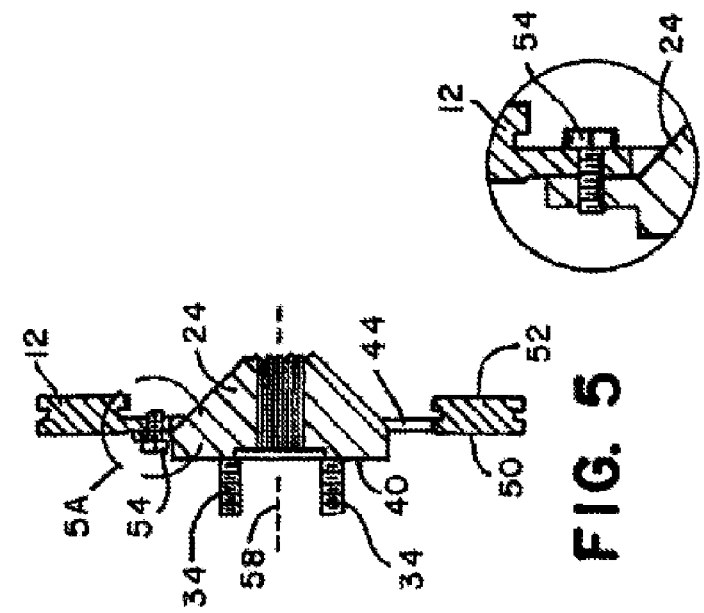
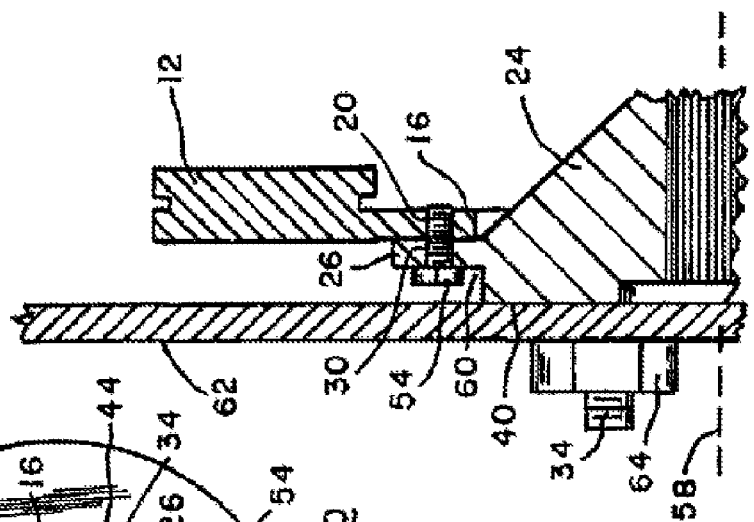
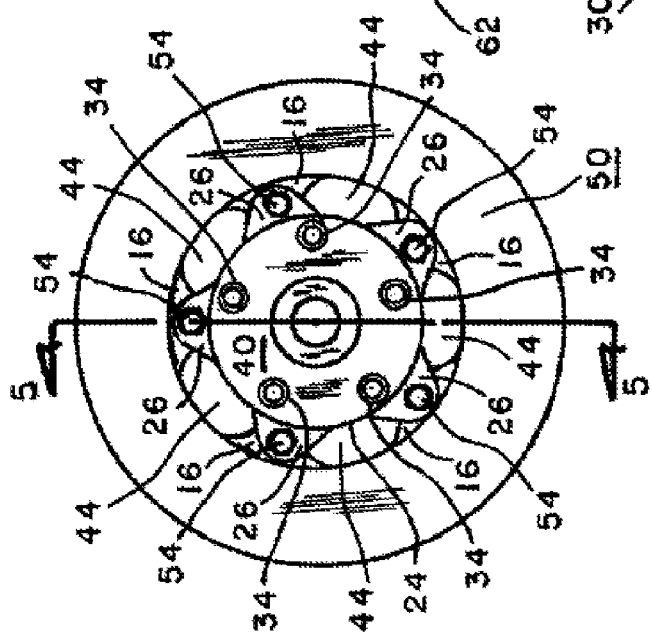

WHEEL HUB AND BRAKE ROTOR ASSEMBLY

BACKGROUND OF THE INVENTION

1. Field of the Invention

The present invention relates to disc brake systems and more particularly to an improved technique for joining a wheel hub and brake rotor to reduce rotor distortion and improve cooling airflow.

2. Description of the Related Art

It is desirable to lower overall corner unit weight while improving performance.

The state of the art in wheel end designs has progressed to a point where the brake rotor is an easily serviced component that is held in place by clamping it between the wheel and wheel hub. It is inherent in this type of design that the unequal clamp load created by tightening the wheel lug nuts distorts the brake rotor which increases the mounted lateral run out (LRO) of the brake rotor. The typical engineering problem associated with high LRO is brake roughness.

U.S. Pat. No. 6,988,598 among others, allows the rotor to slide axially while remaining rotationally fixed to the wheel upon brake actuation alleviating some of the problem.

A recent salutary advance provides solutions to these problems by fixing the rotor to the hub flange outside the wheel-to-hub flange bolted joint to reduce mounted rotor distortion caused by wheel clamp load. In this design, the rotor is fixed to the outboard side of the hub (the side of the hub facing away from the vehicle to which the wheel typically mounts) and retains the "hat" feature common in disc brake rotors.

Another recent and noteworthy advance corrugates the hat portion of the rotor to stiffen it and reduce the transmission of strain energy from the wheel mounting surface to the brake plate.

The high operating temperatures of the brake rotor can also lead to thermal distortion of the brake plates. This distortion can eventually lead to brake roughness. Allowing more airflow around the brake rotor may lead to reduced operating temperatures and therefore less distortion.

SUMMARY OF THE INVENTION

The present invention provides the desired wheel mounting induced reduction in distortion by eliminating the wheel mounting face and hat sections of the rotor. Rotor mounting bosses are added to the wheel hub and a set of bolts are used to attach the rotor to the hub and to transfer the braking torque from the rotor to the wheel hub.

The invention comprises, in one form thereof, a vehicle wheel assembly which includes a disc brake rotor having a scalloped central opening with inwardly extending bosses and a vehicle wheel hub having inboard and outboard surfaces and a scalloped cross section with a like number of outwardly extending bosses whereby the rotor may be axially passed around the hub and then angularly rotated to align the hub and rotor bosses for fixing the rotor to the inboard surface of the hub. The inwardly extending bosses are interspersed with clearance spaces and the outwardly extending bosses are interspersed with clearance spaces so that when the hub and rotor bosses are aligned, the clearance spaces are also aligned to provide rotor cooling air passageways. The wheel hub includes a set of wheel attaching bolts extending from the outboard surface and each hub boss includes a fastener receiving bore. Each rotor boss includes a threaded bore located so that the hub bores and rotor bores may be aligned to receive rotor mounting bolts.

An advantage of the present invention is that the overall weight of the hub/rotor assembly is reduced.

Another advantage is that serviceability of the brake rotor is maintained.

A further advantage resides in removal of the rotor from the wheel clamp joint to decrease rotor distortion.

Another advantage is that rotor pilot corrosion will no longer be a problem when trying to remove the brake rotor after multiple years in service. The new rotor pilot diameter is on the outside diameter of the wheel hub.

Yet another advantage resides in still being able to machine the rotor mounting bosses of the hub off bearing for low run out.

A still further advantage is improved airflow around the brake rotor.

All of the forgoing advantages are achieved while retaining design features that allow removal of the rotor without removing the hub.

BRIEF DESCRIPTION OF THE DRAWINGS

FIG. 1 is a side elevation view of a disc brake rotor according to the present invention;

FIG. 2 is a side elevation view of a vehicle wheel hub according to the present invention;

FIG. 3 is a side elevation view of the rotor of FIG. 1 being assembled to the hub of FIG. 2;

FIG. 4 is a side elevation view of the rotor of FIG. 1 after assembly to the hub of FIG. 2;

FIG. 5 is a cross-section view along lines 5-5 of FIG. 4;

FIG. 5a is an enlarged segment of an alternate way of fixing a rotor to a hub;

FIG. 6 is an enlarged view of a portion of FIG. 5 with a wheel rim fragment assembled thereto;

Corresponding reference characters indicate corresponding parts throughout the several drawing views.

DETAILED DESCRIPTION OF THE INVENTION

Referring now to the drawings and particularly to FIG. 1, there is shown a disc brake rotor 12 having a scalloped central opening 14 formed by inwardly extending bosses 16 interleaved with clearance spaces 38. Each boss or lobe has a threaded bore 20 for receiving one of a plurality of rotor mounting bolts. The scalloped central opening 14 is shaped to receive the wheel hub 24 of FIG. 2.

The vehicle wheel hub of FIG. 2 is adapted to receive a wheel and a disc brake rotor for co-rotation about a vehicle axle axis 58 as illustrated in FIGS. 5 and 6. Hub 24 has a plurality of radially outwardly extending bosses or lobes 26 each having a rotor mounting bolt receiving bore 30. Each adjacent pair of rotor bosses defines therebetween a clearance space 42. Hub 24 has an outboard wheel mounting surface or face 40 from which threaded fasteners such as wheel lug bolts 34 extend.

Rotor 12 is assembled to hub 24 as shown in FIG. 3 by aligning the scalloped central opening 14 with the hub cross-section, moving the rotor in an inboard direction until the rotor lobes are inboard of the hub lobes, and then relatively rotating the hub and rotor through an angle α to align the hub and rotor bosses 16, 26 as illustrated in FIG. 4. This rotation also aligns the respective clearance spaces 38, 42 providing rotor cooling air flow openings 44 between the outboard and inboard rotor braking surfaces 50 and 52. Alignment of the clearance spaces 38, 42 to form the rotor cooling air flow openings 44 is also shown in FIG. 5. The rotation through the angle α further serves to align the rotor bores 20 with corresponding hub bores 30 allowing the rotor and hub to be fastened together by rotor attaching threaded fasteners such as bolts 54.

In FIG. 6, a portion of the vehicle wheel rim 62 has been attached to the outboard surface 40 of the hub 24 by lug nuts 64. While less common, separate wheel mounting bolts that thread into the hub may be used. As best seen in FIG. 6, the hub bosses 26 are all recessed somewhat from the wheel mounting surface 40 as indicated at 60 providing a clearance between the wheel 62 and the rotor mounting bolts 56. The hub thus isolates the rotor from distortions induced by mounting the wheel. In some cases, the hub bores 30 may be threaded and the rotor mounting bolts passed through the rotor bores 20 from the inboard side 52, as depicted in FIG. 5a. This may provide an improved failure mode for loose rotor bolts, however servicing will be somewhat more difficult. In the embodiment of FIGS. 5 and 6, the hub bores 30 may be smooth and the rotor bores 20 threaded with the rotor mounting bolts 54 passing through the hub bores 30, 32 and fixed to the rotor bores 20, 22 from the outboard side 50 to make it easier to assemble.

Servicing the brake rotor requires removal of the lug nuts 64 and the wheel 62. This exposes the rotor mounting bolts 54, 56 for removal. The brake caliper (conventional and not illustrated) must also be removed. Relative rotation of the hub and rotor aligns the bosses and clearance spaces as in FIG. 3 and the rotor may be removed axially.

Thus, while a preferred embodiment has been disclosed, numerous modifications will occur to those of ordinary skill in this art. Accordingly, the scope of the present invention is to be measured by the scope of the claims which follow.

What is claimed is:

1. A vehicle wheel hub adapted to receive a wheel and a disc brake rotor for co-rotation about a vehicle axle axis, the wheel hub comprising:
    an axially inboard rotor mounting surface and an axially outboard wheel receiving surface;
    a set of wheel attaching bolts extending from the outboard wheel receiving surface; and
    a plurality of outwardly protruding lobes interspersed with clearance spaces, each wheel hub lobe including a bore for receiving one of a plurality of rotor attaching threaded fasteners;
    wherein each hub lobe includes an outboard surface, the outboard surface of each hub lobe being axially recessed from the outboard wheel receiving surface.

2. The vehicle wheel hub of claim 1, wherein the number of wheel attaching bolts is the same as the number of lobes.

3. The vehicle wheel hub of claim 1, wherein the wheel attaching bolts are uniformly spaced from one another in a generally circular pattern and the bores are uniformly spaced from one another in a generally circular pattern of greater radius than the bolt circular pattern.

4. A vehicle wheel assembly, comprising:
    a disc brake rotor having a scalloped central opening including inwardly extending bosses; and
    a vehicle wheel hub having inboard and outboard surfaces and a scalloped cross section with a like number of outwardly extending bosses whereby the rotor may be axially passed around the hub and then angularly rotated to align the hub and rotor bosses for fixing the rotor to the inboard surface of the hub, and
    a plurality of threaded fasteners for securing each hub boss to the corresponding aligned rotor boss;
    wherein:
    each hub boss is axially recessed from the outboard surface of the wheel hub;
    each hub boss defines a hub bore and each rotor boss defines a rotor bore, the hub bores and the rotor bores aligning to define fastener receiving bores in which one of the threaded fasteners is threadingly received; and
    the wheel hub includes a set of wheel attaching bolts extending from the outboard surface.

5. The vehicle wheel assembly of claim 4 wherein the inboard surfaces are machined to be perpendicular to the axis of the wheel hub.

6. The vehicle wheel assembly of claim 4, wherein the inwardly extending rotor bosses are interspersed with clearance spaces and the outwardly extending hub bosses are interspersed with clearance spaces whereby, when the hub and rotor bosses are aligned, the clearance spaces are also aligned to provide rotor cooling air passageways.

7. The vehicle wheel assembly of claim 4, wherein each rotor boss includes a threaded bore.

8. The vehicle wheel assembly of claim 7, wherein braking torque is transferred from the rotor to the hub by the rotor mounting bolts and from the hub to the wheel by the wheel attaching bolts.

9. A vehicle wheel assembly, comprising:
    a vehicle wheel having a number of angularly spaced mounting bolt receiving apertures;
    a wheel hub having axially inboard and outboard surfaces and including a plurality of outwardly protruding hub bosses interspersed with clearance spaces, said hub bosses having inboard and outboard surfaces;
    a disc brake rotor having a like plurality of inwardly protruding rotor bosses interspersed with clearance spaces;
    a first set of threaded fasteners coupling the wheel to the outboard surface of the hub; and
    a second set of threaded fasteners coupling the rotor bosses to the inboard surfaces of the hub bosses;
    wherein:
    each hub boss is axially recessed from the outboard surface of the wheel hub and spaced apart from the vehicle wheel;
    each hub boss defines a hub bore and each rotor boss defines a rotor bore, each hub bore being aligned with one of the rotor bores to define a fastener receiving bore in which one of the threaded fasteners of the second set are threadingly received; and
    each threaded fastener of the second set is spaced apart from said wheel when said threaded fastener is received in said fastener receiving bore.

10. The vehicle wheel assembly of claim 9, wherein braking torque is transferred from the rotor to the hub by the second set of threaded fasteners and from the hub to the wheel by the first set of threaded fasteners.

11. The vehicle wheel assembly of claim 9, wherein the outward radial extent of the hub bosses is less than the inward radial extent of the rotor clearance spaces and the inward radial extent of the rotor bosses is less than the outward radial extent of the hub spaces whereby, when the second set of threaded fasteners is removed, the rotor may be angularly displaced relative to the hub to align the bosses of one with the clearance spaces of the other allowing removal of the rotor from the vehicle without removing the hub from the vehicle.

12. The vehicle wheel assembly of claim 9, wherein the rotor bosses are axially inboard of the hub bosses when the rotor is assembled to the hub.

13. The vehicle wheel assembly of claim 9, wherein the hub clearance spaces are generally alignable with the rotor clearance spaces to provide rotor cooling air passageways.

* * * * *